(12) United States Patent
Weikel et al.

(10) Patent No.: US 9,409,323 B2
(45) Date of Patent: Aug. 9, 2016

(54) BEAD-FORMING APPARATUS

(71) Applicant: Crayola LLC, Easton, PA (US)

(72) Inventors: Jennifer Weikel, Easton, PA (US);
Jeremy M. Fallis, Jr., Telford, PA (US);
Thomas R. Rau, Easton, PA (US); Eden Castle, Bath, PA (US)

(73) Assignee: Crayola, LLC, Easton, PA (US)

( * ) Notice: Subject to any disclaimer, the term of this patent is extended or adjusted under 35 U.S.C. 154(b) by 536 days.

(21) Appl. No.: 13/800,909

(22) Filed: Mar. 13, 2013

(65) Prior Publication Data

US 2013/0193615 A1 Aug. 1, 2013

Related U.S. Application Data

(63) Continuation-in-part of application No. 13/399,559, filed on Feb. 17, 2012, now Pat. No. 8,852,484.

(60) Provisional application No. 61/444,355, filed on Feb. 18, 2011.

(51) Int. Cl.
*B29C 43/04* (2006.01)
*B28B 1/02* (2006.01)
*B28B 3/12* (2006.01)
*A21C 3/06* (2006.01)
*A21C 3/02* (2006.01)

(52) U.S. Cl.
CPC . *B29C 43/04* (2013.01); *B28B 1/02* (2013.01); *B28B 3/126* (2013.01); *A21C 3/02* (2013.01); *A21C 3/022* (2013.01); *A21C 3/06* (2013.01); *A21C 3/065* (2013.01)

(58) Field of Classification Search
CPC .......... B29C 43/04; B28B 1/02; B28B 3/126; A21C 3/02; A21C 3/022; A21C 3/06; A21C 3/065
USPC ........................................... 425/394; 264/310
See application file for complete search history.

(56) References Cited

U.S. PATENT DOCUMENTS

| 240,966 A | 5/1881 | Chappell |
| 431,454 A | 7/1890 | Dyke |
| 471,243 A | 3/1892 | Mishler |
| 2,867,000 A | 1/1959 | Huszar |

(Continued)

OTHER PUBLICATIONS

Notice of Allowance, dated Jun. 2, 2014 in U.S. Appl. No. 13/399,559, 10 pages.

*Primary Examiner* — Alison Hindenlang
*Assistant Examiner* — Robert J Grun
(74) *Attorney, Agent, or Firm* — Shook, Hardy & Bacon, L.L.P.

(57) ABSTRACT

A bead-forming apparatus and method for its use are described. The bead-forming apparatus includes a base with a pair of legs extending from a top surface. First ends of the legs couple to respective eccentric elements. The eccentric elements removeably and rotatably couple to a platen. Second ends of the legs are rotatably and slideably mated with a gear train disposed within the base. The legs are slideably translatable into the base and the gear train maintains a rotational orientation of the legs and the eccentric elements coupled thereto. The platen is thus moveable through a circular path defined by the rotation of the eccentric elements and legs. As such, a plug of moldable material placed between the base and the platen and in contact with the platen, is formed into a double-cone shape by movement of the platen through the circular path.

20 Claims, 11 Drawing Sheets

(56) References Cited

U.S. PATENT DOCUMENTS

| | | | |
|---|---|---|---|
| 3,704,664 A * | 12/1972 | Fisher, Jr. | A23P 1/086 425/321 |
| 4,946,359 A | 8/1990 | Christen | |
| 5,348,751 A * | 9/1994 | Packer | A21C 3/06 426/297 |
| 6,224,365 B1 | 5/2001 | Ou-Young | |
| 2004/0212117 A1 | 10/2004 | Lee | |

* cited by examiner

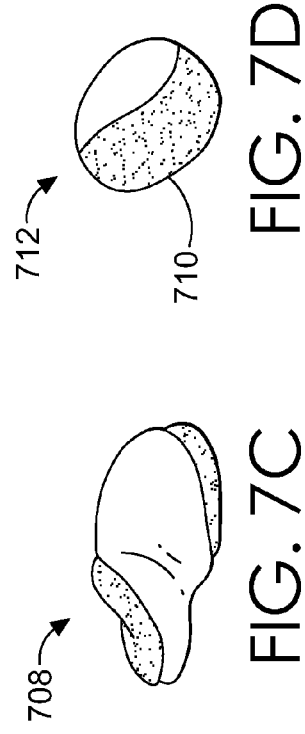
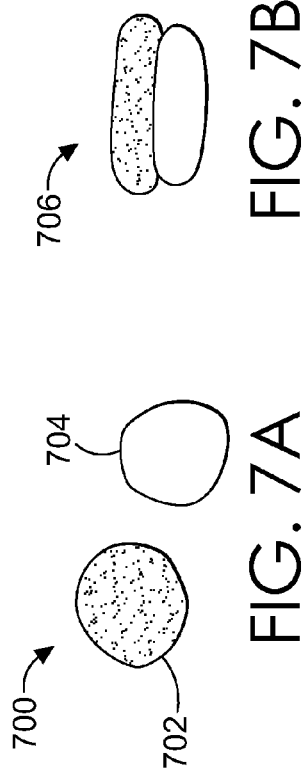
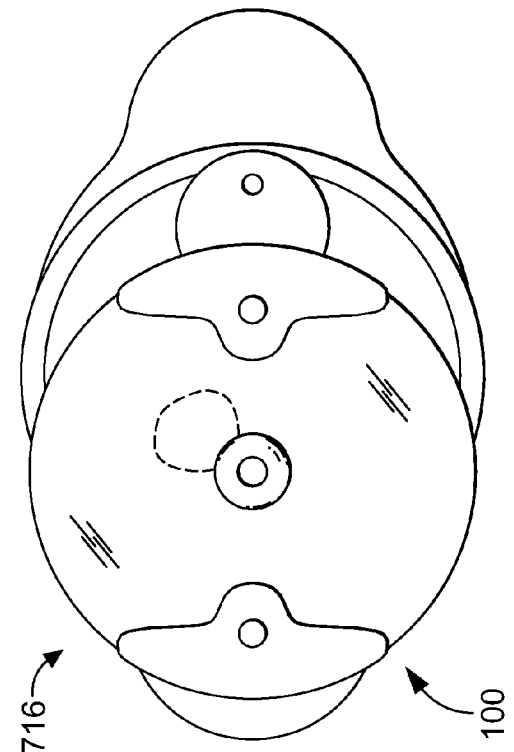
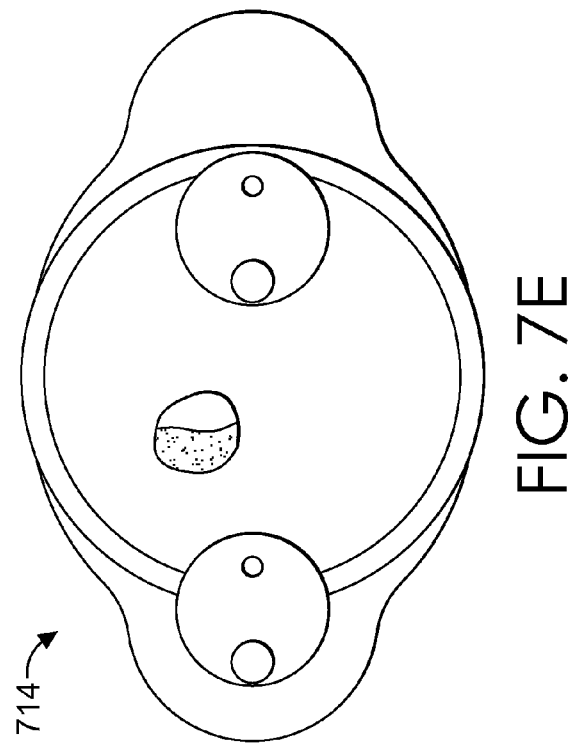

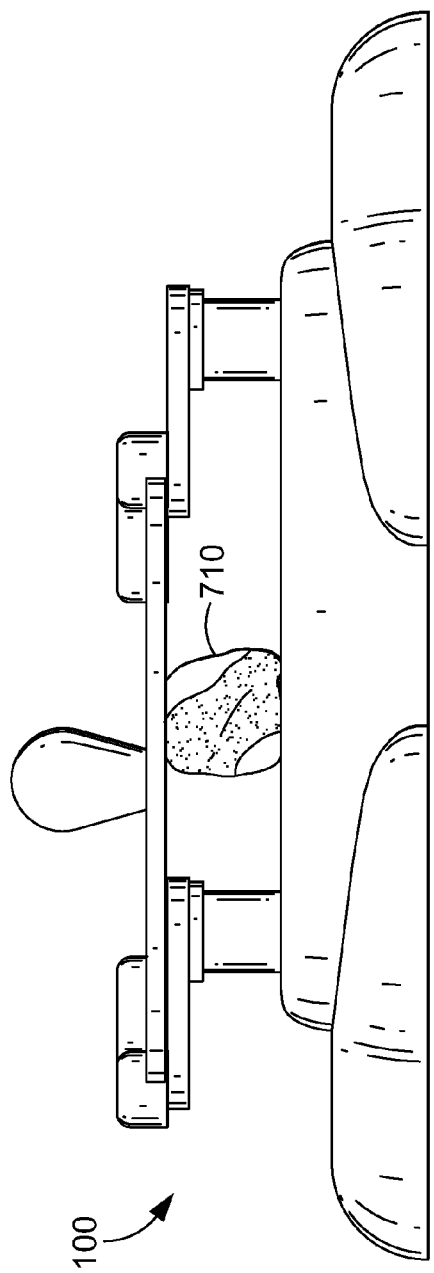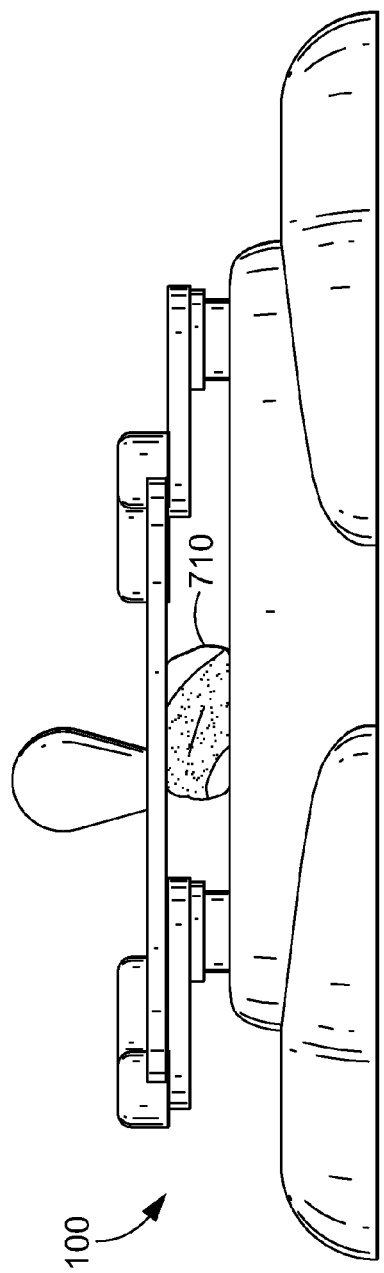

BEAD-FORMING APPARATUS

CROSS-REFERENCE TO RELATED APPLICATIONS

This Application is a continuation-in-part of U.S. patent application Ser. No. 13/399,559, filed Feb. 17, 2012, entitled "Bead-Forming Apparatus," which claims priority to U.S. Provisional Patent Application Ser. No. 61/444,355, filed Feb. 18, 2011, the disclosure of both of which are hereby incorporated herein in their entirety by reference.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

Embodiments of the invention include apparatus and methods for making beads from moldable materials such as modeling clay. A bead-forming apparatus is provided that includes an upper platen and a stationary base coupled via a pair of eccentric elements. A portion of one or more modeling materials are pressed together to form a generally spherical form and the materials are placed between the base and upper platen. The upper platen is pressed toward the base to contact the modeling material and is moved through a circular path defined by rotation of the eccentric elements; the circular path is larger in diameter than the upper platen. As such, the portion of modeling material is formed into a double cone shape and the modeling materials are swirled together.

DESCRIPTION OF THE DRAWINGS

Illustrative embodiments of the invention are described in detail below with reference to the attached drawing figures, and wherein:

FIGS. 7A-7F are a series of views of modeling materials being prepared for use with the bead-forming apparatus depicted in FIG. 1 in accordance with an embodiment of the invention;

FIGS. 8A and 8B are side elevational views of the bead-forming apparatus depicted in FIG. 1 with the modeling materials of FIG. 7 disposed therein in accordance with an embodiment of the invention;

DETAILED DESCRIPTION

Figure 1:
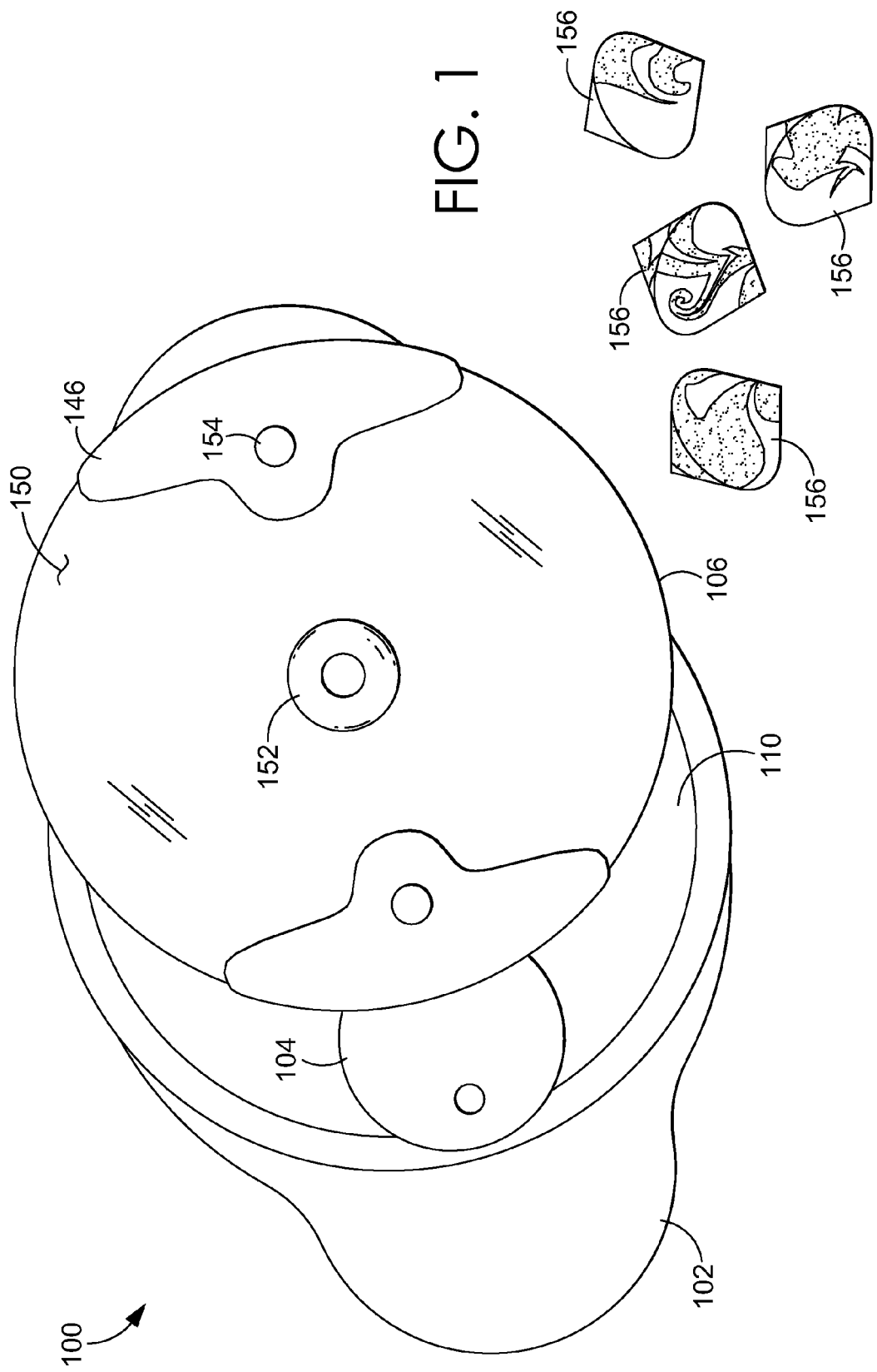
FIG. 1 is a top view of a bead-forming apparatus and a number of beads made thereby in accordance with an embodiment of the invention.
Figure 2:
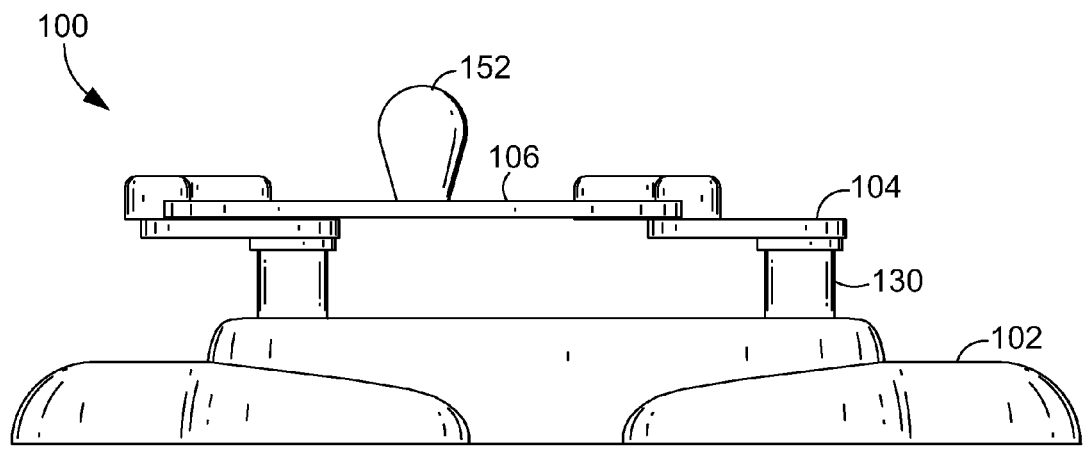
FIG. 2 is an elevational view of the bead-forming apparatus depicted in FIG. 1.
Figure 3:
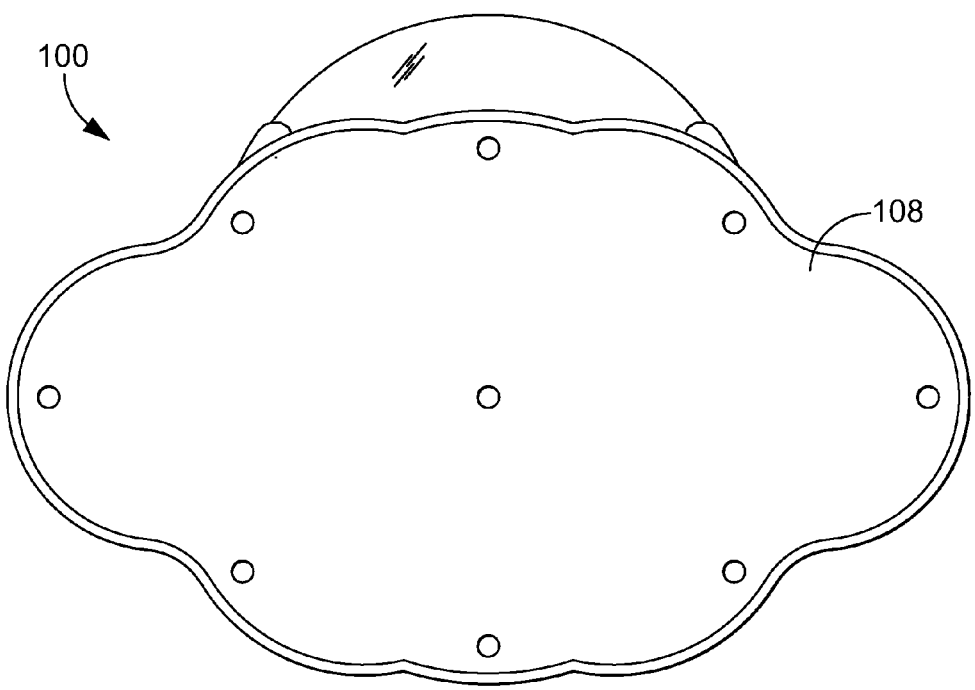
FIG. 3 is a bottom view of the bead-forming apparatus depicted in FIG. 1.
Figure 4:
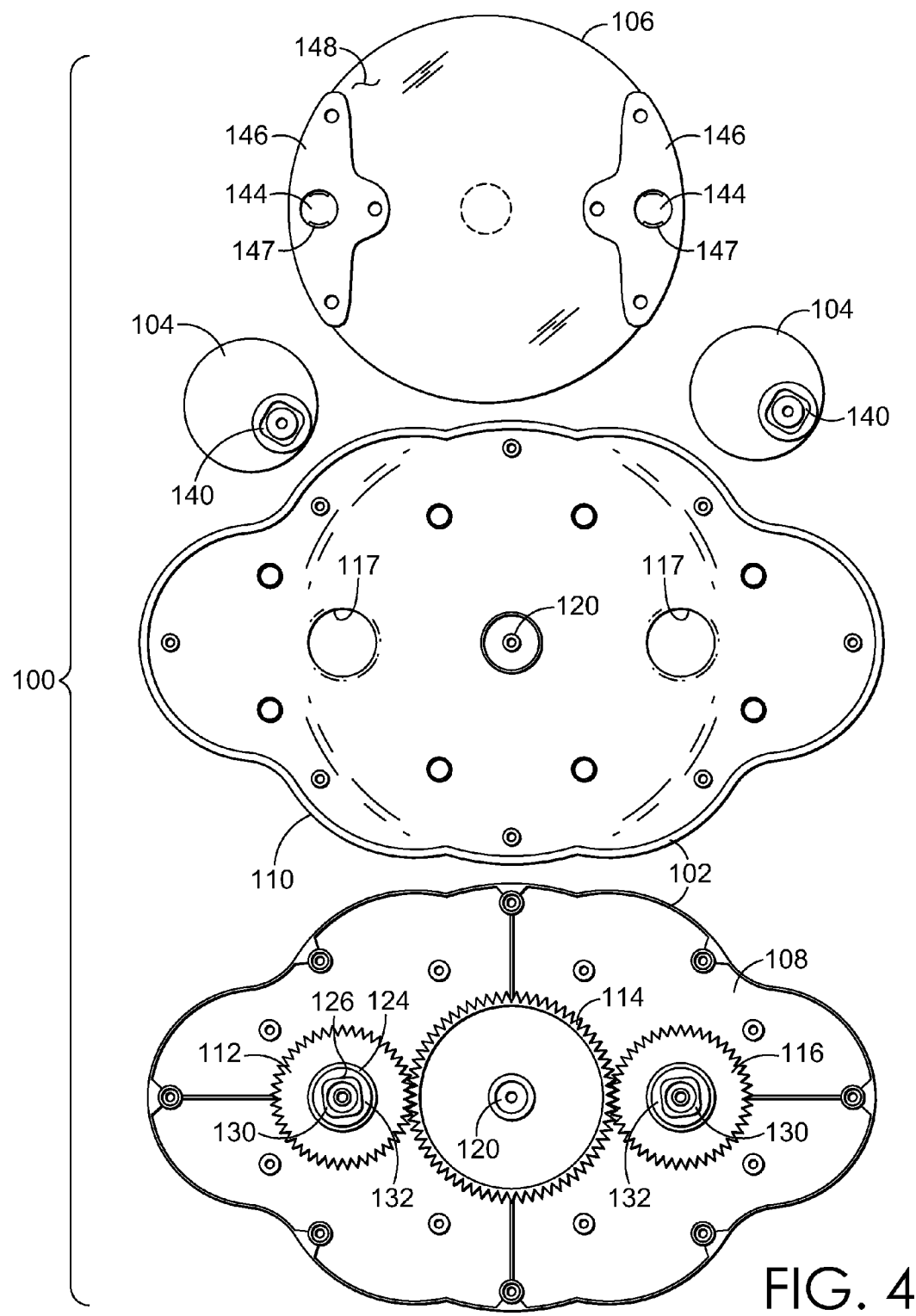
FIG. 4 is a view of components of the bead-forming apparatus depicted in FIG. 1 in a partially dismantled condition.
Figure 5:
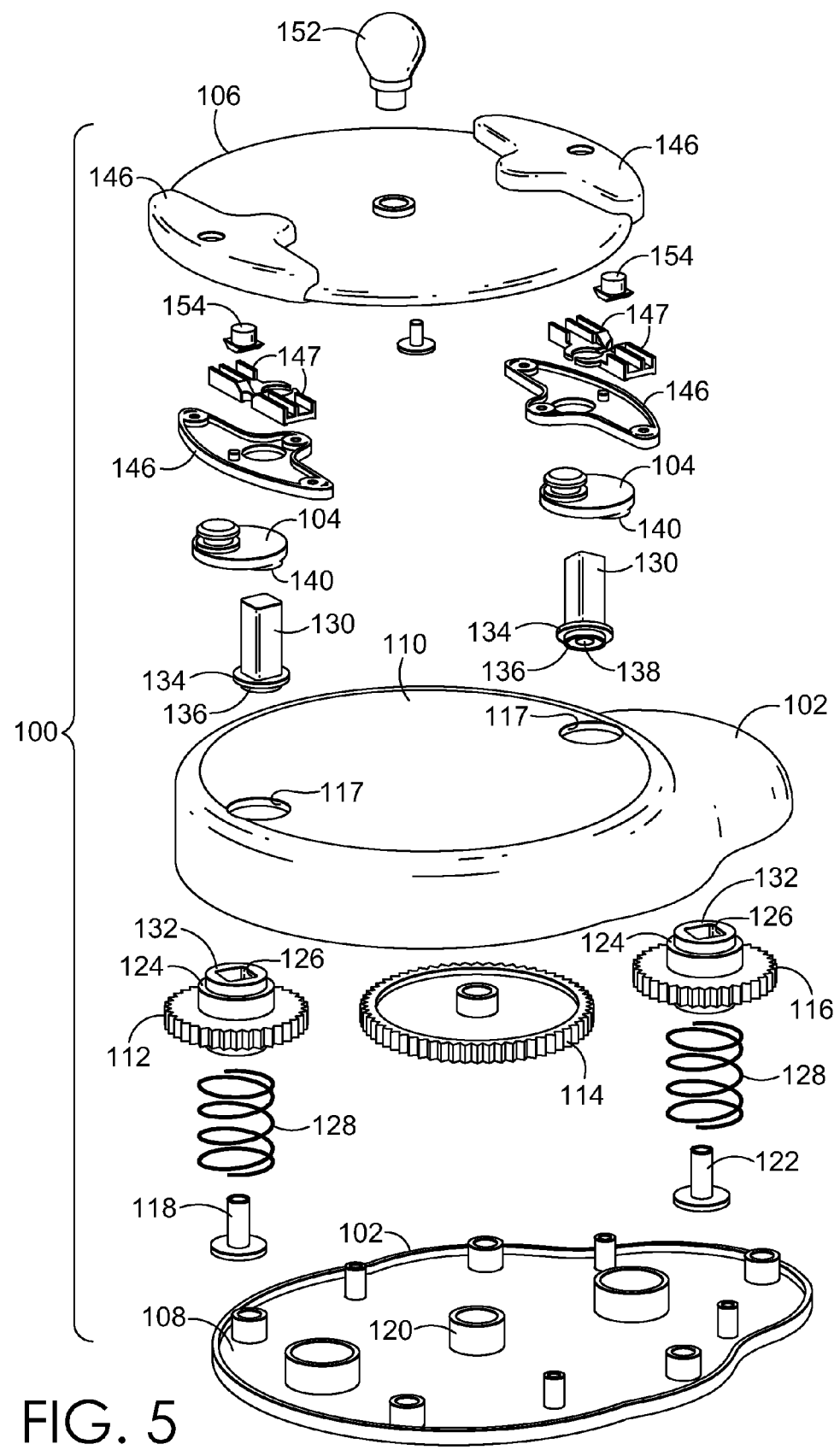
FIG. 5 is an exploded view of a bead-forming apparatus in accordance with an embodiment of the invention.
Figure 6A:
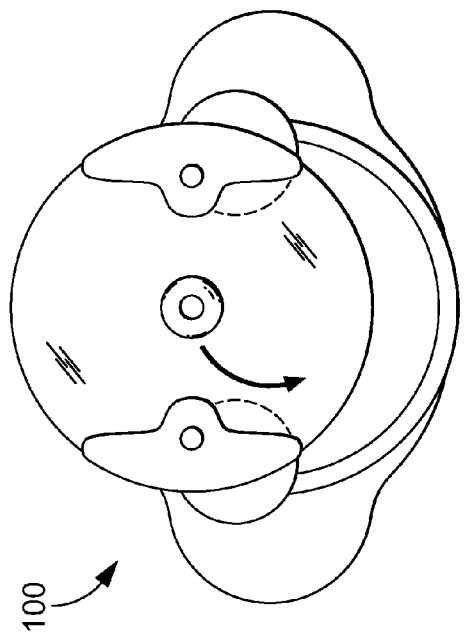
FIGS. 6A-6D are series of top plan views of the bead-forming apparatus depicted in FIG. 1 showing movement of a top platen along a circular path in accordance with an embodiment of the invention.
Figure 6B:
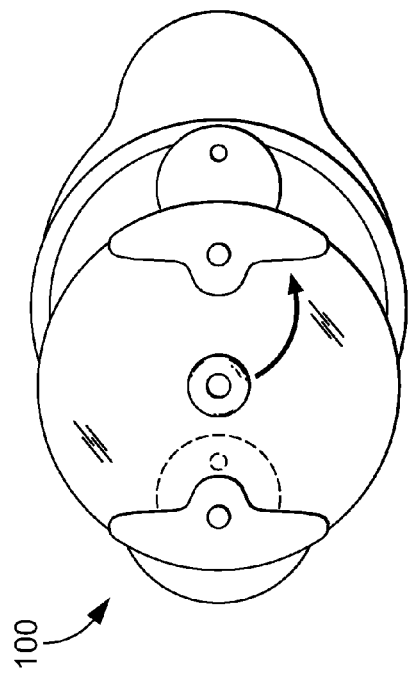
Figure 6C:
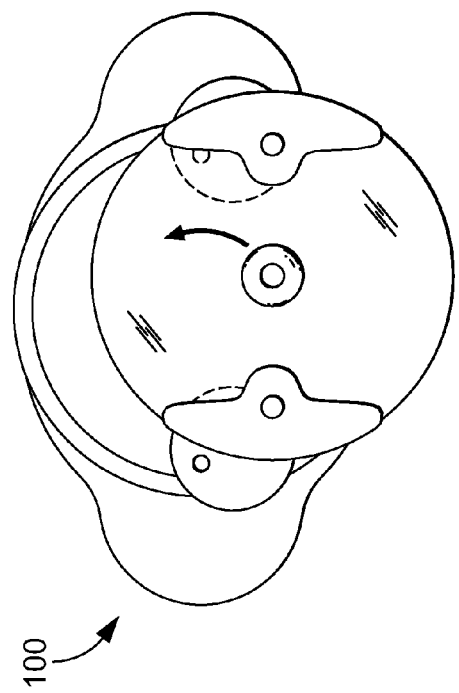
Figure 6D:
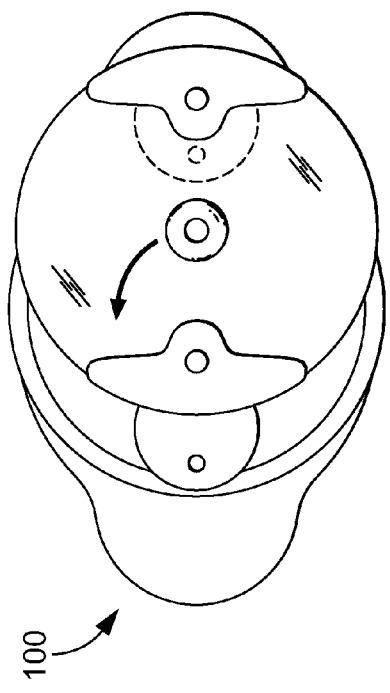

The subject matter of embodiments of the invention is described with specificity herein to meet statutory requirements. But the description itself is not intended to necessarily limit the scope of claims. Rather, the claimed subject matter might be embodied in other ways to include different steps, components, or combinations thereof in conjunction with other present or future technologies. Terms should not be interpreted as implying any particular order among or between various steps herein disclosed unless and except when the order of individual steps is explicitly described.

The manufacture of beads for use as ornamentation and jewelry has been practiced since ancient times. Beads may be formed from moldable materials such as clay, glass, metals, plastics, and the like as well as non-moldable materials like gemstones. Many techniques are employed by bead makers to produce desired shapes or forms of beads. Techniques are also used to provide desired appearances to the beads, such as by layering, mixing, blending, or swirling together multiple constituent materials.

Embodiments of the invention provide apparatus and methods for producing beads from moldable materials. The materials include any modeling compounds or the like. For example, the materials might include flour-based doughs, rice-based doughs, earth clays, modeling clay, oil-based clays, and the like. In an embodiment, the materials are one or more of Dough, Air-Dry Clay, Modeling Clay, and Model Magic® available from Crayola LLC of Easton, Pa. The materials can be air-dry or kiln dry and can be reusable.

In an embodiment, the materials are sufficiently soft or malleable to be capable of forming by hand and with a bead-forming apparatus as described more fully below. The materials may require pre-working or softening prior to use. The materials also have sufficient viscosity to sufficiently retain a shape or form into which they have been formed.

The materials are provided in various colors and include any desired additives or other components to provide a desired physical property or appearance. In an embodiment, multiple separate materials are used; each having a different color or colors.

With reference to the figures, and to FIGS. 1-5 in particular, a bead-forming apparatus 100 is described in accordance with an embodiment of the invention. The components described below are constructed by manufacturing methods and from materials known in the art such as, for example, and not limitation, injection molded plastics. However, any desired manufacturing methods and materials may be used in embodiments of the invention without departing from the scope described herein.

The apparatus 100 includes a base 102, a pair of eccentric discs 104, and an upper platen 106. As depicted best by FIGS. 4 and 5, the base 102 includes a base plate 108 and a cover 110 with three gears 112, 114, and 116 disposed therebetween. The cover 110 includes a pair of apertures 117 to provide access to the gears 112 and 116, as described more fully below. The base plate 108 and/or the cover 110 also include one or more features extending from an interior surface thereof that form axles 118, 120, and 122 upon which the gears 112, 114, and 116 are disposed, respectively. The axles 118, 120, 122 are configured such that the gear 112 meshes with the gear 114 and the gear 116 also meshes with the gear 114. The gears 112, 114, and 116 are depicted herein as spur gears, however, any desired gear configuration and transmission design that produces the below described motion may be employed without departing from the scope of embodiments of the invention.

The gears 112 and 116 include a coaxially located projection 124 and an aperture 126 configured to accept a spring 128 and a leg 130. The projection 124 extends perpendicular to a side surface of the gears 112/116 a distance to allow sufficient travel of the leg 130, as described more fully below. The aperture 126 passes through the gear 112/116 and through the projection 124. The aperture 126 has a cylindrical cross-sectional shape throughout the majority of its length and has a polygonal cross-sectional shape at a terminating face 132 of the projection 124. In an embodiment, the cross-sectional shape is a square, however any desired shape might be employed. The polygonal cross-sectional shape is configured to accommodate a corresponding shape of the leg 130. The polygonal cross-sectional shape of the leg 130 and the aperture 126 allow the leg 130 to be slideably disposed therein and also rotationally couples the leg 130 and the gear 112/116 such that rotation of the leg 130 rotates the respective gear 112/116 and vice versa.

The leg 130 also includes an annular flange 134 near a first end 136 of the leg 130. The annular flange 134 is configured to fit within the aperture 126 but to interact with the polygonal cross-sectional shaped terminating face 132 of the projection 124 such that the leg 130 cannot be removed from the gear 112/116 through the terminating face 132. Additionally, a hollow 138 is provided in the first end 136 of the leg 130. The hollow 138 has sufficient dimensions to slideably accept the axle 118/122 therein.

With additional reference to FIG. 7, the eccentric discs 104 are each a generally circular plate having a coupling 140 to the leg 130 along a bottom side thereof and a pin 142 disposed on a top side thereof. In an embodiment the eccentric discs 104 have any desired shape. The coupling 140 and the pin 142 are located near opposite edges of the disc 104, e.g. near opposite ends of a line drawn along a diameter of the disc 104. In embodiments, the coupling 140 and pin 142 are configured in any desired positions on the eccentric discs 104 in which the pin 142 is not coaxially aligned with the coupling 140. The pin 142 provides a removable coupling to the upper platen 106.

With continued reference to FIGS. 1-5, the upper platen 106 is a generally circular plate having a pair of apertures 144 and associated coupling apparatus 146 disposed near opposite edges thereof. The apertures 144 are located in a bottom surface 148 of the platen 106 and are configured to simultaneously align with the pins 142 on both of the eccentric discs 104. The coupling apparatus 146 includes a pair of jaws 147 that engage a depression (not shown) in the side of the pin 142 when inserted into the aperture 144, however any known coupling apparatus might be employed. The coupling apparatus 146 and the pins 142 provide a rotatable coupling between the eccentric discs 104 and the upper platen 106. An upper surface 150 of the platen 106 includes a handle 152 extending therefrom and a pair of release buttons 154 that correspond with each of the coupling apparatus 146 and apertures 144. The handle 152 is rotatably coupled to the upper platen 106.

With additional reference now to FIGS. 6-9, operation of the bead-forming apparatus 100 to produce a double cone bead 156 is described in accordance with embodiments of the invention. As depicted at 700 in FIG. 7, portions 702 and 704 of two differently colored modeling materials are selected. In an embodiment, any number of modeling materials, including a single modeling material, is used. As depicted at 706, the portions 702 and 704 are pressed together and may be twisted, folded, or otherwise formed as shown at 708. The combined two portions 702/704 might be formed into a generally spherical shape or plug 710 as depicted at 712 but, such is not required. The plug 710 is placed on top of the base 102 as shown at 714. The upper platen 106 is coupled to the eccentric discs 104 by inserting the pins 142 into the apertures 144 and engaging the coupling apparatus 146, as depicted at 816 and FIG. 8A.

The upper platen 106 is depressed toward the base 102 thereby contacting and at least partially compressing the plug 710, as depicted in FIG. 8B. Depressing the upper platen 106 slides the legs 130 through the apertures 126 compressing the springs 128 between the first end 136 of the legs and the base plate 108.

The upper platen 106 is moved along a circular path as depicted in FIG. 6. The upper platen 106 does not rotate with respect to the base 102 but rather, is translated through the circular path as defined by the eccentric discs 104. Movement of the upper platen 106 rotates the eccentric discs 104 about their couplings 140 with the legs 130. This rotation further rotates the legs 130 and thus the gears 112 and 116. The rotation of the eccentric discs 104 and the legs 130 with respect to one another is maintained in synchronization by the gears 112, 114, and 116. As such, rotation of one eccentric disc 104 or leg 130 equally rotates the other eccentric disc 104 and leg 130 even without engagement of the upper platen 102.

Figure 9:
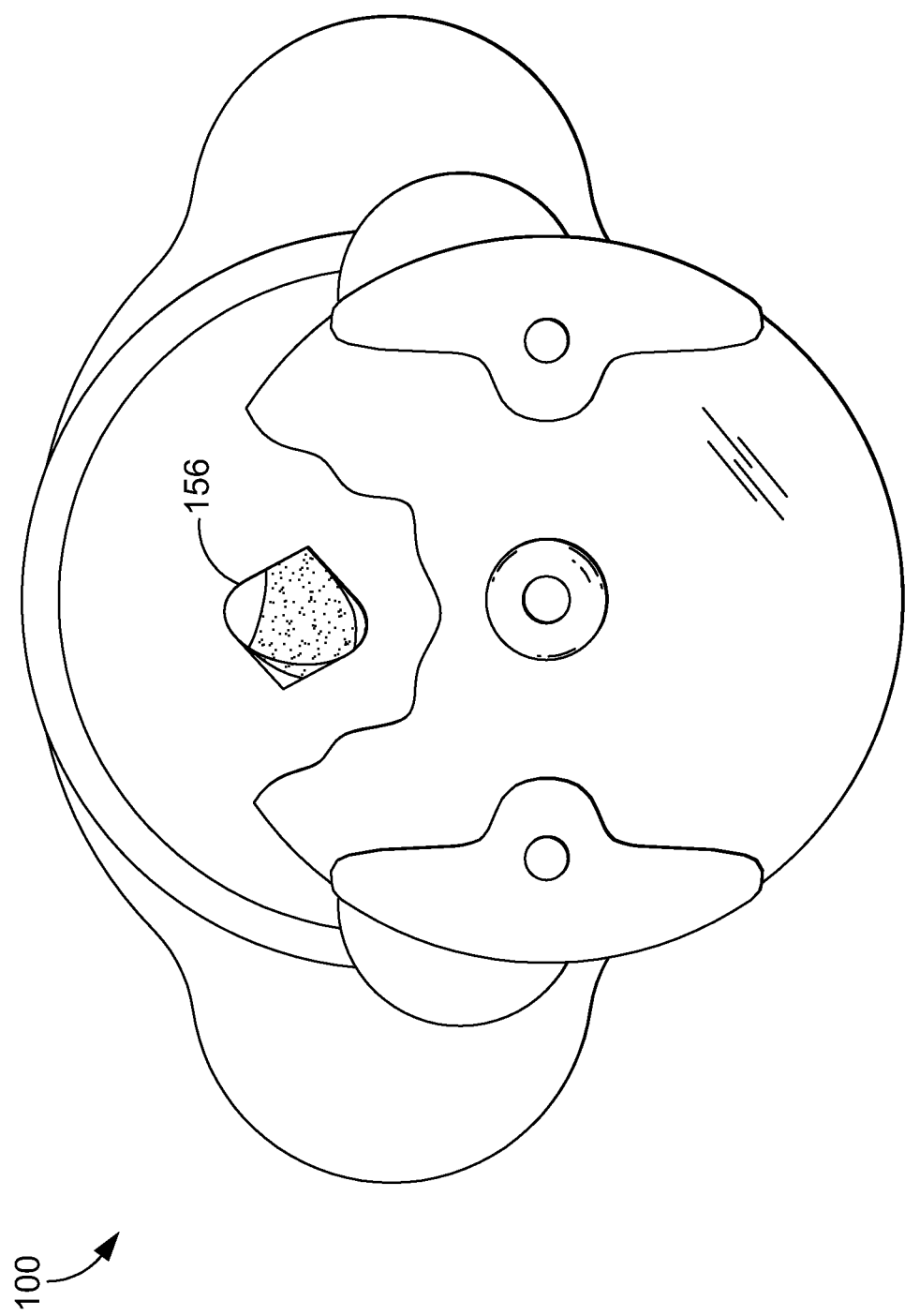
FIG. 9 is a top plan view of the bead-forming apparatus depicted in FIG. 1 with the modeling materials of FIG. 7 formed into a double cone bead in accordance with an embodiment of the invention.
Figure 10:
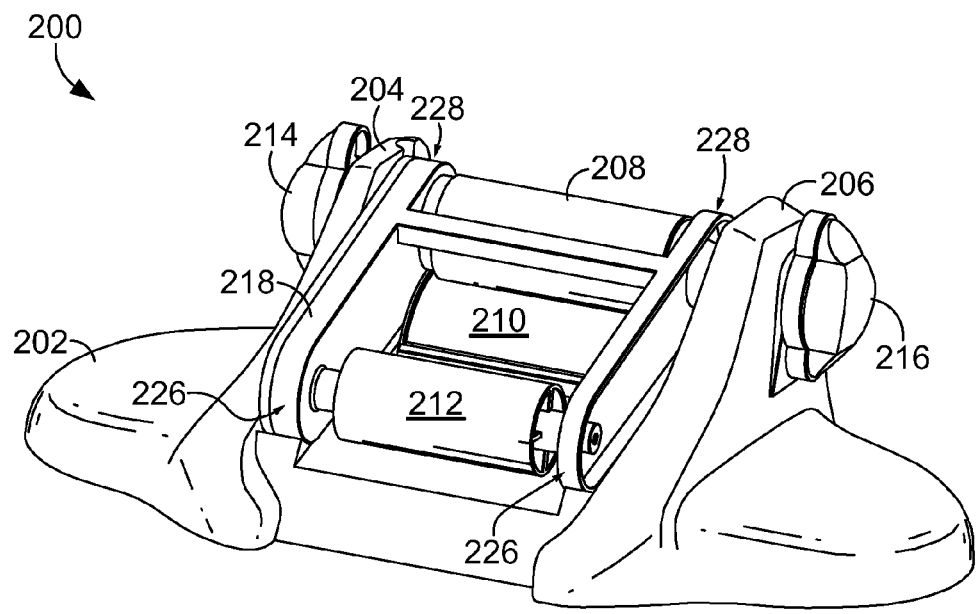
FIG. 10 is a perspective view of a bead-forming apparatus, in accordance with an embodiment of the invention.

Movement and depression of the upper platen 106 continues until a desired form is produced from the plug 710, as depicted in FIG. 9. The amount of depression of the upper platen 106 may be slowly reduced during movement of the upper platen 106 to allow formation of the plug 710 into the double cone bead 156 as depicted in FIGS. 1 and 9. Alternatively, depression may be maintained while movement of the upper platen 106 is halted to produce a more organic, oblong, flattened form as desired.

In addition to producing the double cone bead 156, depression and movement of the upper platen 106 also produces swirling of the modeling materials 702 and 704 as depicted in FIG. 1. As such, an amount of depression and duration of movement of the upper platen 106 may be tailored to provide a desired amount of swirling of the modeling materials 702 and 704.

With reference now to FIGS. 10-13, a bead-forming apparatus 200 is described in accordance with embodiments of the invention. The components described below are constructed by manufacturing methods and from materials known in the art such as, for example, and not limitation, injection molded plastics. However, any desired manufacturing methods and materials may be used in embodiments of the invention without departing from the scope described herein.

The apparatus 200 includes a base 202, a pair of side supports 204 and 206, a first roller 208, a second roller 210, and a third roller 212. As will be understood, although apparatus 200 is depicted as including first, second, and third rollers 208, 210, and 212, apparatus 200 may include, in further embodiments, additional rollers and/or gears that operate in conjunction with the rollers and gears depicted in association with apparatus 200. In embodiments, side supports 204 and 206 include knobs 214 and 216 coupled to the base 202 of apparatus 200. In embodiments, rotation of one or both of knobs 214 and 216 causes rotation of the corresponding rollers coupled directly or indirectly to knobs 214 and 216. For example, rotation of knobs 214 and 216 causes rotation of first roller 208 in a first direction, rotation of second roller 210 and third roller 212 in a second direction.

First, second, and third rollers 208, 210, and 212 are generally cylindrical in shape, having a curved outer surface against which a moldable material may be advanced and/or formed during operation of the apparatus 200. The curved outer surface of first, second, and third rollers 208, 210, and 212 may be smooth in texture, or may have an amount of surface texture added to the roller's outer surface. Accordingly, in one embodiment, second roller 210 has a texture on the curved outer surface that allows an amount of modeling material 230 to grip and/or conform to the surface of the second roller 210 as it advances between the first and second rollers 208 and 210. In one example, the rough texture of second roller 210 contacts at least a portion of a modeling material 230 advancing between the first roller 208 and the second roller 210, which is then detached from the rough surface of second roller 210 using a lead-in edge 220 adjacent the second roller 210. In further embodiments, first, second, and third rollers 208, 210, and 212 vary in size, such as the circumference of second roller 210 being larger than first roller 208, which may in turn be larger than the circumference of third roller 212.

Figure 11:
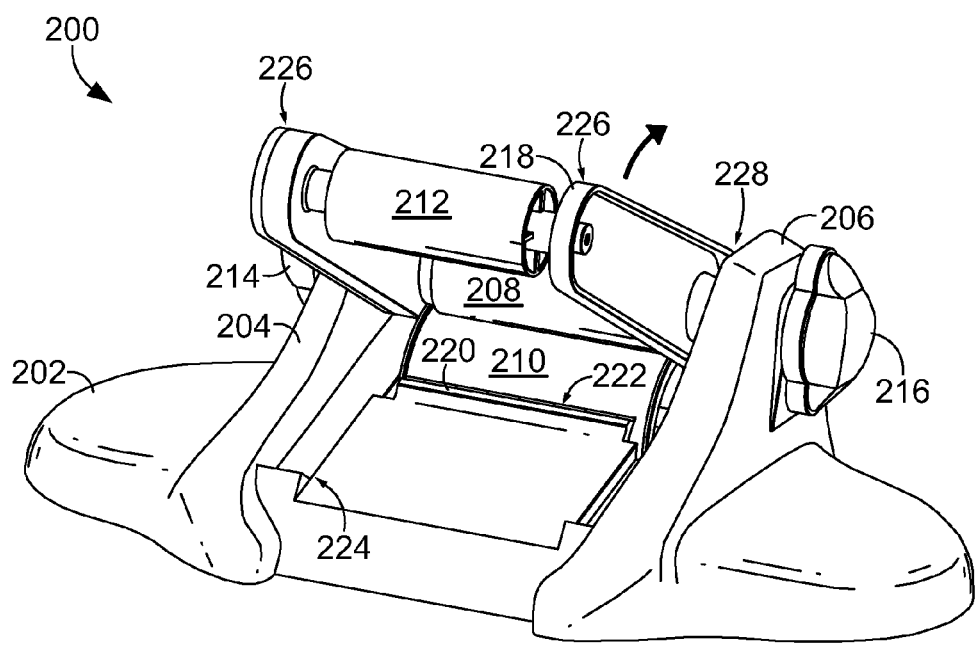
FIG. 11 is a perspective view of the bead-forming apparatus of FIG. 10, with the pivoting arm in a partially raised position.

As shown in FIG. 11, the lead-in edge 220 is adjacent the second roller 210, having a first edge 222 that contacts the modeling material 230 advancing over the outer surface of second roller 210. The lead-in edge 220 may be any sort of surface for contacting the modeling material 230 advancing off of second roller 210, such as a plastic or metallic surface integral to a top surface the base, which separates the modeling material 230 from the outer surface of the second roller 210. In one embodiment, the first edge 222 of lead-in edge 220 is a curved tip that shears the modeling material 230 off of the second roller 210. In other embodiments, the first edge 222 of lead-in edge 220 is a straight blade.

Figure 12:
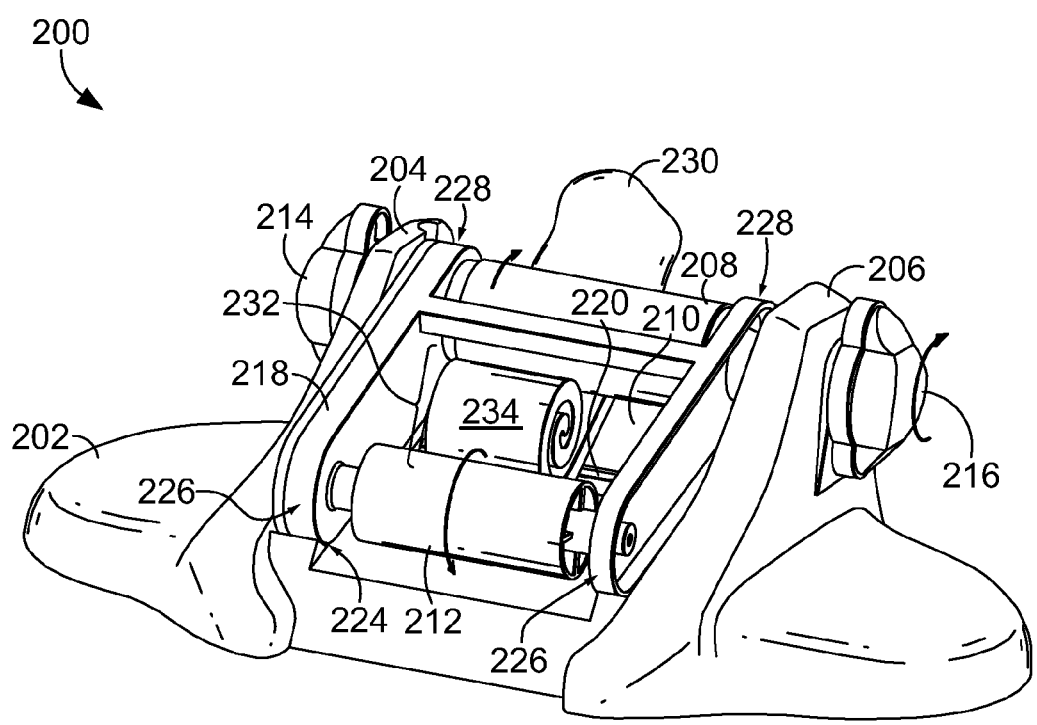
FIG. 12 is a perspective view of the bead-forming apparatus of FIG. 10, with an amount of modeling material being processed by the apparatus in accordance with an embodiment of the invention.

In one embodiment, as depicted in FIG. 12, an amount of modeling material 230 is processed by the bead-forming apparatus 200 by passing the modeling material 230 between first roller 208 and second roller 210 from a back side of the apparatus 200. For example, modeling material 230 is advanced between first roller 208 and second roller 210 based on the counter-rotation of each roller (i.e. the first roller 208 rotating in a first direction and the second roller 210 rotating in a second direction). As such, modeling material 230 becomes flattened between first roller 208 and second roller 210, and continues advancing through the apparatus 200 based on continued rotation of one or both of the knobs 214 and 216 on each side of the apparatus 200. In embodiments, based on an amount of pressure applied to modeling material 230 by the first roller 208 and second roller 210, the thickness of the flattened portion of the modeling material 230 may vary. In some embodiments, the thickness of the flattened portion of modeling material 230 depends upon an amount of space between first roller 208 and second roller 210, as well as the rotation of each roller with respect to one or more gears associated with the apparatus 200, as discussed below.

Having passed between first and second rollers 208 and 210, a first end 232 of modeling material 230 is sheared from contact with the second roller 210 based on contact with at least a portion of the lead-in edge 220. The modeling material 230 then contacts the surface of rotating third roller 212 and forms a coiled bead 234. Accordingly, rotation of knobs 214 and 216 causes the coordinated rotation of first, second, and third rollers 208, 210, and 212 to advance modeling material 230 through the apparatus 200 to produce a coiled bead 234. In embodiments of the invention, coiled bead 234 is formed when the first end 232 of modeling material 230, flattened between first and second rollers 208 and 210, disengages from the surface of second roller 210, contacts the surface of third roller 212, and coils back upon itself, as shown in FIG. 12. In other words, rotation of first roller 208 in a first direction and second roller 210 in a second direction causes coiling of modeling material 230 into a coiled bead 234 formed upon rolling the first end 232 of modeling material back into the first direction (based on contacting the third roller 212 rotating in the second direction).

Embodiments of the apparatus 200 may also be used to produce a flattened portion of modeling material 230, without forming a coiled bead 234. For example, with reference to FIG. 11, first roller 208 and third roller 212 are supported at least in part, by pivoting arm 218. In embodiments, pivoting arm 218 is coupled to third roller 212 at a first end 226, and first roller 208 at a second end 228. First end 226 of pivoting arm 218 may be "locked" into position with respect to the base 202 by engaging at least a portion of the first end 226 of pivoting arm 218 against a contact surface 224 of the base 202, thereby restricting the pivoting of pivoting arm 218 at the second end 228. In embodiments, detent snaps on one or both sides of the pivoting arm 218 engage with the contact surface 224 to restrict movement of the first end 226 of pivoting arm 218. For example, during processing of a coiled bead 234, the pivoting arm 218 is locked into a first position engaged against the contact surface 224 of base 202, such as the locked position depicted in FIGS. 10 and 12. In another example, as shown in FIG. 11, the pivoting arm 218 may be raised and/or disengaged from base 202 (and from contact surface 224). By raising pivoting arm 218 into an upward position with respect to the base 202, the third roller 212 is removed from the path of travel of modeling material 230, and therefore does not contact the first end 232 of modeling material 230 as it advances between first and second rollers 208 and 210.

Figure 13:
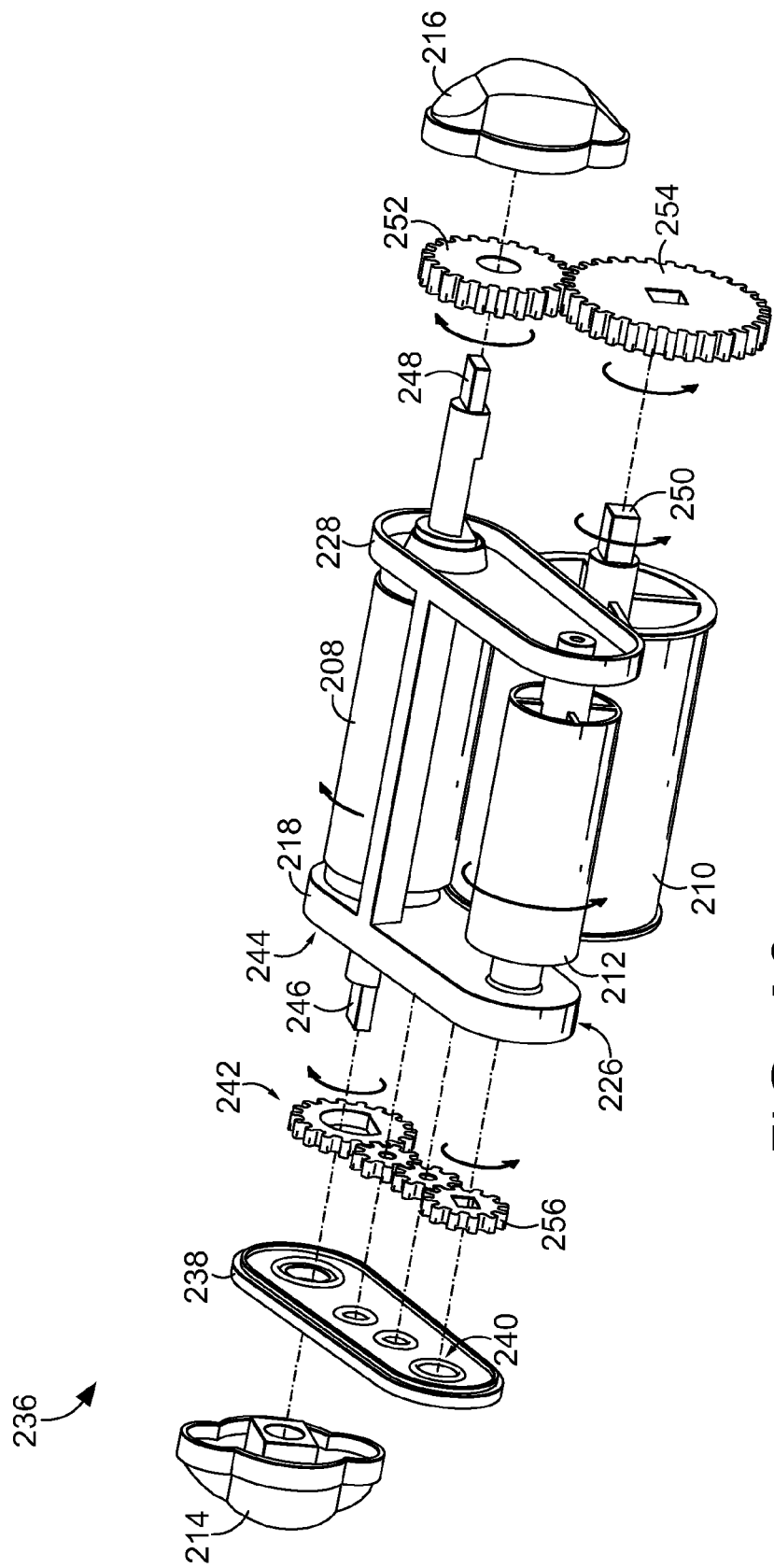
FIG. 13 is a perspective view of a portion of the bead-forming apparatus of FIG. 10, with internal portions of the apparatus exposed, in accordance with an embodiment of the invention.

Turning now to FIG. 13, internal portions 236 of a bead-forming apparatus 200 are depicted according to an embodiment of the invention. In one embodiment, the internal portions 236 include a side panel 238 of the pivoting arm 218, and a plurality of features 240 on the side panel 238 that mate to a plurality of gears 242 for rotation of one or more of the first, second, and third rollers 208, 210, and 212. In one embodiment, the plurality of gears 242 includes third gear 256 that is coupled to third roller 212, thereby causing rotation of third roller 212 in the second direction.

In one example, projections 246 and 248 extend from the sides of pivoting arm 218 to couple to knobs 214 and 216. FIG. 13 also depicts first gear 252 rotating in a first direction and second gear 254 rotating in a second direction. In embodiments of the invention, rotation of first gear 252 in a first direction causes rotation of first roller 208 in the same, first direction, while rotation of second gear 254 in a second direction causes rotation of second roller 210 in the same, second direction, and rotation of third gear 256 causes rotation of the third roller 212 in the same, second direction.

Accordingly, in one embodiment, the coupling of the plurality of gears 242 causes synchronous rotation of the plurality of gears 242 (including third gear 256) with first gear 252 and second gear 254, based on rotation of the first gear 252. The gears 242, 252, 254, and 256 are depicted herein as spur gears, however, any desired gear configuration and transmission design that produces the motion described herein may be employed without departing from the scope of embodiments of the invention.

In one embodiment, the synchronous rotation of the respective gears provides for the controlled and/or continuous rotation of the first, second, and third rollers 208, 210, and 212 during formation of a coiled bead 234 using the apparatus 200. For example, rotation of the first gear 252 may cause rotation of the first roller 208 in a first direction, as well as rotation of the second gear 254 (causing rotation of the second roller 210) and third gear 256 (and corresponding third roller 212) in a second direction. In embodiments of the invention, the counter-rotation of first roller 208 and second roller 210 flattens modeling material 230, as shown in FIG. 12, which is then tightly coiled by way of the third roller 212 applying pressure against the first end 232 of the modeling material 230, to produce a coiled bead 234.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A bead-forming apparatus comprising:
   a base having a pair of side supports;
   a pivoting arm coupled to at least a portion of the pair of side supports;
   a first roller coupled to the pair of side supports and to a first end of the pivoting arm;
   a second roller coupled to the pair of side supports;
   a third roller coupled to a second end of the pivoting arm; and
   a plurality of gears coupled to the first, second, and third rollers, wherein rotation of the plurality of gears causes rotation of the first and third gears in a first direction and rotation of the third gear in a second direction.

2. The bead-forming apparatus of claim 1, wherein the pivoting arm is moveable between a first position and a second position relative to the base unit.

3. The bead-forming apparatus of claim 2, wherein the first position comprises a locking position with respect to the base such that one or more features on at least one surface of the pivoting arm couples directly to the base.

4. The bead-forming apparatus of claim 3, wherein an amount of modeling material advanced between the first and second rollers is coiled into a bead based on contacting the third roller with the pivoting arm in the first position.

5. The bead-forming apparatus of claim 4, wherein the second position comprises a raised position with respect to the base such that the third roller is in a raised position.

6. The bead-forming apparatus of claim 5, wherein an amount of modeling material advanced between the first and second rollers is flattened into a continuous piece of modeling material with the pivoting arm in the second position.

7. The bead-forming apparatus of claim 1, wherein the base comprises a lead-in edge on a surface of the base adjoining an exterior surface of the second roller.

8. The bead-forming apparatus of claim 7, wherein the lead-in edge is a curved edge.

9. The bead-forming apparatus of claim 1, wherein the second roller has a textured surface on at least a portion of a curved outer surface of the second roller.

10. The bead-forming apparatus of claim 1, wherein each of the first, second, and third rollers has a cylindrical shape oriented around a horizontal axis of rotation with respect to the base.

11. The bead-forming apparatus of claim 1, further comprising:
    one or more gears coupled to at least a portion of the pivoting arm, wherein at least one of the one or more gears is configured to synchronize rotation of the third roller with at least one of the first and second rollers.

12. The bead-forming apparatus of claim 11, wherein at least one of the one or more gears is disposed internal to the pivoting arm.

13. The bead-forming apparatus of claim 1, further comprising:
    a plurality of gears coupled to at least a portion of the base, wherein rotation of one or more of the plurality of gears coupled to the base causes rotation of one or more of the first, second, and third rollers.

14. The bead-forming apparatus of claim 13, wherein the plurality of gears coupled to at least a portion of the base comprises a first gear, a second gear, and a third gear, wherein rotation of the first gear in a first direction causes rotation of the first roller in the first direction, rotation of the second gear in a second direction causes rotation of the second roller in the second direction, and rotation of the third gear in a second direction causes rotation of the third roller in the second direction.

15. A bead-forming apparatus comprising:
    a base;
    a plurality of gears;
    a first roller configured to rotate in a first direction;
    a second roller configured to rotate in a second direction;
    a third roller configured to rotate in the second direction; and
    a pivoting arm coupled to the first and third rollers.

16. The bead-forming apparatus of claim 15, wherein rotation of the first, second, and third rollers is based on rotation of one or more of the plurality of gears.

17. The bead-forming apparatus of claim 16, wherein rotation of one or more of the plurality of gears comprises rotation of the first roller in the first direction based on rotation of a first gear in the first direction, rotation of the second roller in the second direction based on rotation of a second gear in the second direction, and rotation of the third roller in the second direction based on rotation of the third gear in the second direction.

18. The bead-forming apparatus of claim 15, wherein an amount of modeling material advanced between the first and second rollers is coiled into a bead based on contacting the third roller with the pivoting arm in a locked position with respect to the base.

19. A method for producing a coiled bead from a moldable material, the method comprising:
    providing a bead-forming apparatus that includes a base;
    a pivoting arm;
    a plurality of first gears disposed internal to the pivoting arm;
    a plurality of second gears coupled to the base;

a first roller configured to rotate in a first direction;
a second roller configured to rotate in a second direction; and
a third roller configured to rotate in the second direction;
compressing an amount of moldable material between the first and second rollers to provide a flattened amount of moldable material based on rotation of the first and second rollers; and
forming a coiled bead from the amount of moldable material based on rotation of the third roller against at least a portion of the flattened amount of moldable material.

20. The method of claim 19, further comprising:
releasing the coiled bead from the bead-forming apparatus.

\* \* \* \* \*